United States Patent
Kuromizu

(10) Patent No.: US 9,004,710 B2
(45) Date of Patent: Apr. 14, 2015

(54) ILLUMINATION DEVICE, DISPLAY DEVICE, TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/238,083

(22) PCT Filed: Aug. 3, 2012

(86) PCT No.: PCT/JP2012/069816
§ 371 (c)(1),
(2), (4) Date: Feb. 10, 2014

(87) PCT Pub. No.: WO2013/024715
PCT Pub. Date: Feb. 21, 2013

(65) Prior Publication Data
US 2014/0204276 A1    Jul. 24, 2014

(30) Foreign Application Priority Data

Aug. 12, 2011  (JP) .................................. 2011-177054

(51) Int. Cl.
| | |
|---|---|
| *F21S 4/00* | (2006.01) |
| *F21V 19/00* | (2006.01) |
| *H04N 5/66* | (2006.01) |
| *G02F 1/1335* | (2006.01) |
| *H04N 5/645* | (2006.01) |

(52) U.S. Cl.
CPC ................ *F21V 19/003* (2013.01); *H04N 5/66* (2013.01); *G02F 1/133603* (2013.01); *G02F 1/133611* (2013.01); *H04N 5/645* (2013.01)

(58) Field of Classification Search
USPC ........ 362/249.01, 249.02, 97.2, 613; 348/725
See application file for complete search history.

(56) References Cited

U.S. PATENT DOCUMENTS

| | | | |
|---|---|---|---|
| 8,602,580 B2 * | 12/2013 | Ikuta ............................ | 362/97.1 |
| 8,668,355 B2 * | 3/2014 | Moriyama et al. ....... | 362/249.01 |
| 2012/0087122 A1 | 4/2012 | Takeuchi et al. | |
| 2012/0087126 A1 | 4/2012 | Takeuchi et al. | |

FOREIGN PATENT DOCUMENTS

JP        2011-34954 A        2/2011

* cited by examiner

*Primary Examiner* — Anabel Ton
(74) *Attorney, Agent, or Firm* — Chen Yoshimura LLP

(57) ABSTRACT

A backlight device of the present invention includes: a chassis having a bottom plate; a plurality of LED substrates 25 that are rectangular and that are arranged such that one end face on the short side of the LED substrate 25 faces the short side of the bottom plate; LEDs arranged on the LED substrates 25; first through holes that go through the LED substrates 25; second through holes 42 that are disposed nearer the end face of the LED substrate 25 than the first through holes 41, that go through the LED substrates 25, and that are horizontally longer than the first through holes 41 along the long side direction of the LED substrates 25; plate-shaped through holes disposed in the bottom plate; and securing pins that have a size that enables the LED substrates 25 to be secured in the plate surface direction thereof by the securing pins going through the first through holes 41 and plate-shaped through holes, that secure the LED substrates 25 in the short side direction thereof by going through the second through holes 42 and plate-shaped through holes, and that are a size allowing the LED substrates 25 to move in the long side direction thereof.

10 Claims, 14 Drawing Sheets

ILLUMINATION DEVICE, DISPLAY DEVICE, TELEVISION RECEIVING DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own; therefore, it is necessary to provide a separate backlight device as an illumination device.

One known type of backlight device is a direct-lit type backlight device in which light is directly supplied to the liquid crystal panel from the rear surface thereof. In such a direct-lit type backlight device, a light source substrate having light sources such as LEDs disposed thereon is attached to a bottom plate of a chassis that is used as a case. Through holes for allowing the pins that secure the light source substrate to go through are formed on the light source substrate, and through holes are also formed at locations on the bottom plate of the chassis that face these through holes. The light source substrate is secured by the pins going through the through holes formed on the light source substrate and the through holes formed on the bottom plate. One light source substrate is secured by a plurality of pins. Patent Document 1 discloses a conventional example of such a direct-lit backlight device.

RELATED ART DOCUMENT

Patent Document

Patent Document 1: Japanese Patent Application Laid-Open Publication No. 2011-34954

Problems to be Solved by the Invention

In a backlight device such as that disclosed in Patent Document 1 above, however, the light source substrate expands due to heat when the light source substrate generates heat due to the light-emitting of the light sources. In this case, in sections of the light source substrate that have been secured by pins, the light source substrate is restricted from extending in the plate surface direction thereof, whereas in sections that are not secured by pins or sections in the vicinity of a pin but not fully secured due to the size of the through hole, the light source substrate is free to expand along the plate surface direction thereof. Therefore, during thermal expansion of the light source substrate, there was a mix of places that did extend and places that did not extend on the substrate, and the places that did extend and did not extend for each substrate were not uniform. As a result, a stable brightness was not maintained in the vicinity of the center of the display surface, and the brightness could not be made uniform for the entire display surface.

SUMMARY OF THE INVENTION

The technology disclosed in the present specification was made in view of the above-mentioned problems. The technology disclosed in the present specification aims at providing a direct-lit device that can have uniform brightness on an entire display surface.

Means for Solving the Problems

The present invention relates to an illumination device including a chassis having at least a plate-shaped portion; a plurality of light source substrates that are rectangular and arranged on a surface of the plate-shaped portion such that at least an end face of a short side of the respective light source substrates faces an edge of the plate-shaped portion; light sources arranged on the light source substrates, a surface of each of the light sources on the plate-shaped portion side being a light-emitting side; first through holes penetrating the light source substrates; second through holes that, in a plan view of the plate-shaped portion, are disposed more in the vicinity of the above-mentioned end face of the respective light source substrates than the first through holes, the second through holes penetrating the light source substrates and being more horizontally elongated than the first through holes along a long side direction of the light source substrates; through holes in the plate-shaped portion that are disposed in the plate-shaped portion respectively corresponding in position to the first through holes and the second through holes; and securing pins that have a size that allows the light source substrates to be secured in a plate surface direction thereof by the securing pins going through the first through holes and the through holes in the plate-shaped portion, the securing pins securing the light source substrates in the short side direction thereof by going through the second through holes and the through holes in the plate-shaped portion, the securing pins having a size that allows the light source substrates to move in the long side direction thereof.

According to the above-mentioned illumination device, when the light source substrates generate heat and the light source substrates then expand in the long side direction thereof, the light source substrates are restricted from expanding in the vicinity of the first through holes, and are free to expand in the vicinity of the second through holes. Accordingly, the light source substrates expand and extend in the long side direction thereof near the respective end faces of the light source substrates, whereas the light source substrates are restricted from extending on the side opposite to this end face, or in a section that is separated from this end face. This can make the extension amount of each section on the plate surface of each light source substrate substantially uniform, and can make the brightness of the entire display surface uniform.

The plate-shaped portion may be rectangular, and each of the plurality of light source substrates may be arranged such that the long side direction thereof is along a long side direction of the plate-shaped portion.

With this configuration, the brightness of the entire display surface can be made uniform in the illumination device in which each light source substrate is arranged such that the respective end faces thereof face the short sides of the plate-shaped portion.

The light source substrates may have a length such that both short sides thereof face both short sides of the plate-shaped portion.

With this configuration, the brightness of the entire display surface can be made uniform in the illumination device in which the second through holes are disposed near both end sides in the long side direction of each light source substrate and the first through holes are disposed near the center of the light source substrate in the long side direction.

In the plan view of the plate-shaped portion, third through holes may be provided that are disposed closer to the end face of the respective light source substrates than the second through holes and that penetrate the light source substrates, the third through holes being horizontally longer in the long side direction of the light source substrates than the second through holes.

With this configuration, the extension amount of the light source substrate due to heat generated by the light source substrate can be made increasingly larger towards the end faces, in a configuration in which the first through holes to third through holes are disposed in the light source substrate. As such, the brightness on the entire display surface can be adjusted with precision.

The first through holes and the second through holes may each include two through holes, one of the through holes being a positioning hole and one of the through holes being a securing hole, and the through holes in the plate-shaped portion may include two through holes, one of the through holes corresponding in position to the positioning hole and one of the through holes corresponding in position to the securing hole.

With this configuration, in the manufacturing process of the illumination device, first the light source substrate is positioned using the positioning hole, and thereafter the light source substrate can be secured in at least one plate surface direction thereof using the securing hole. Thus, the light source substrates can be arranged with precision, and the system for brightness uniformity on the entire display surface can be improved.

The illumination device may further include diffusion lenses that are arranged on each of the plurality of light source substrates and that cover the light-emitting side of the light sources, the diffusion lenses diffusing light from the light sources.

With this configuration, by having light from the light sources pass through the diffusion lenses, the light from the light sources is diffused, and the directivity thereof is lessened. Therefore, even when the number of light sources is reduced, a prescribed brightness can be maintained in the illumination device.

Holding member through holes may be disposed over the light source substrates, a reflective sheet may be further provided that has at least a bottom section laid on the plate-shaped portion and light source substrates, lens insertion holes that are disposed on the bottom section and through which the diffusion lenses are inserted, and holding member insertion holes disposed at locations overlapping the holding member through holes, and the reflective sheet may be held on the plate-shaped portion and light source substrates by holding members that are locked in the holding member through holes by being inserted into the holding member though holes.

With this configuration, the usage efficiency of light emitted from the light sources can be increased.

The light sources may be white light emitting diodes.

With this configuration, it is possible to extend the life of the light sources and reduce the power consumption thereof.

The white light emitting diodes may include one of the following combinations: a combination of a first light-emitting chip that emits blue light and a first light-emitting layer that is provided around the first light-emitting chip and that has a light-emitting peak in a yellow region; a combination of a first light-emitting chip that emits blue light and a second light-emitting layer that is provided around the first light-emitting chip and that has respective light-emitting peaks in a green region and a red region; a combination of a first light-emitting chip that emits blue light, a third light-emitting layer that is provided around the first light-emitting chip and that has a light-emitting peak in a green region, and a second light-emitting chip that emits red light; a combination of a first light-emitting chip that emits blue light, a second light-emitting chip that emits red light, and a third light-emitting chip that emits green light; or a combination of a fourth light-emitting chip that emits ultraviolet light and a fourth light-emitting layer that is provided around the fourth light-emitting chip and that has respective light-emitting peaks in a blue region and a red region.

With this configuration, the color tone can even out as a whole, and illumination light with a substantially even color tone can be achieved.

The present invention can also be expressed as a display device that includes a display panel that conducts display using light from the above-mentioned illumination device. Also, a display device that uses a liquid crystal panel that uses liquid crystal as the display panel is novel and useful. A television receiver that includes the above-mentioned display device is also novel and useful.

Effects of the Invention

According to the present invention, a direct-lit illumination device that can have uniform brightness on an entire display surface can be provided.

BRIEF DESCRIPTION OF THE DRAWINGS

FIG. 5 is an enlarged plan view of a CF substrate 11a.

DETAILED DESCRIPTION OF EMBODIMENTS

Embodiment 1

Figure 2:
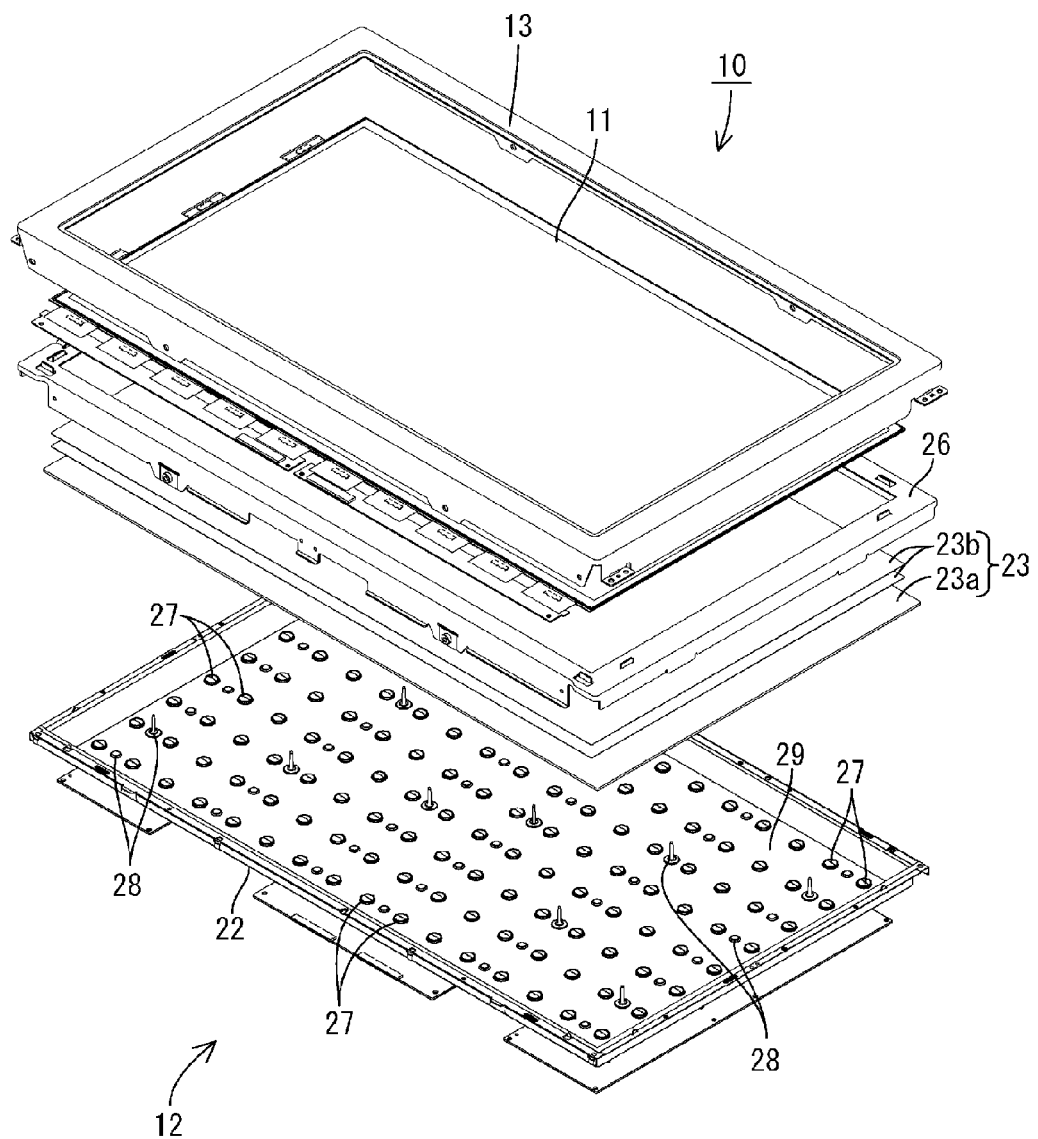
FIG. 2 is an exploded perspective view of a liquid crystal display device 10.
Figure 3:
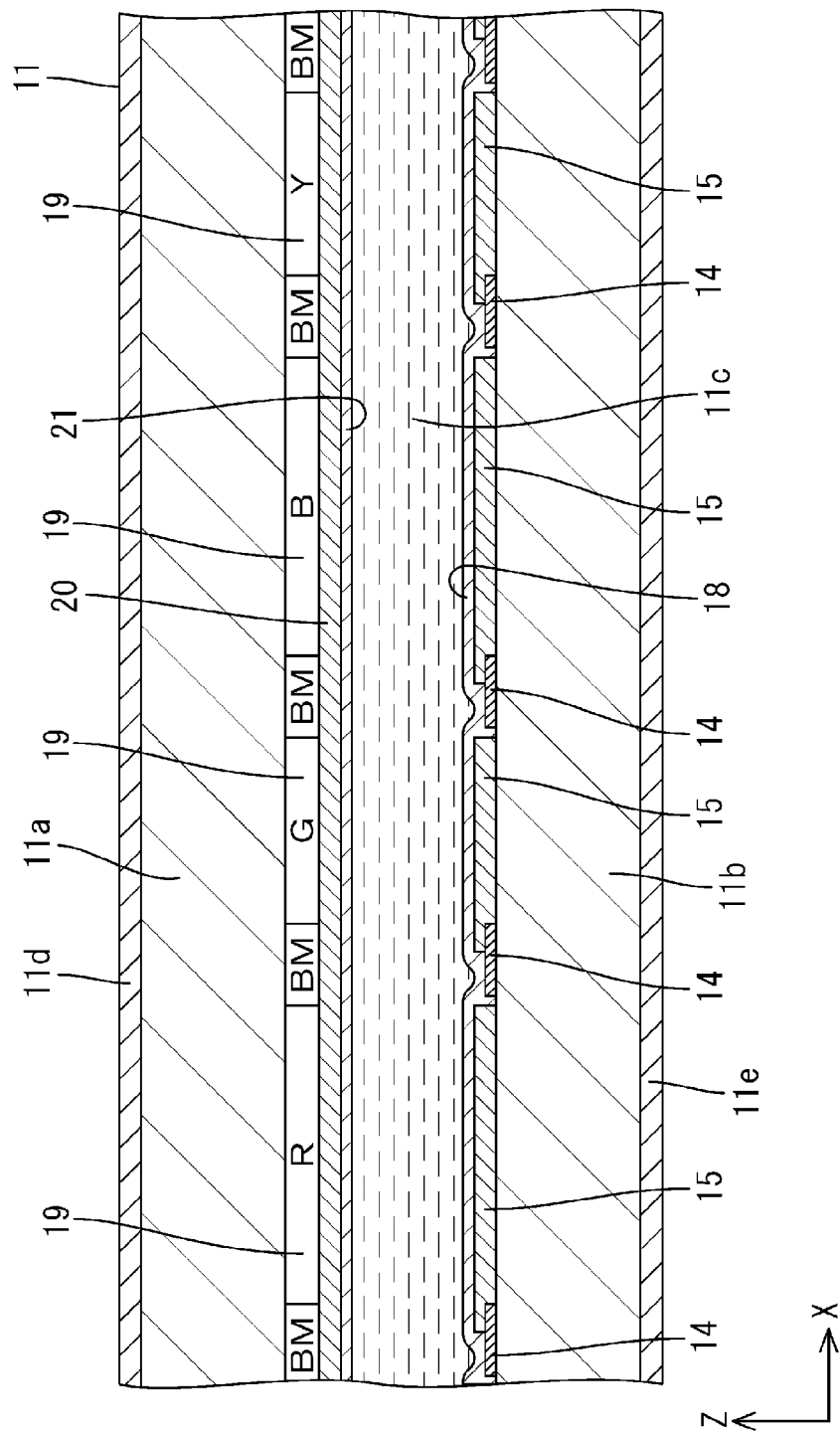
FIG. 3 is a cross-sectional view of a liquid crystal panel 11 along the long side direction.

Embodiment 1 will be described with reference to the drawings. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 2 and 3 is the front side, and the bottom side of FIGS. 2 and 3 is the rear side.

(Television Receiver)

Figure 1:
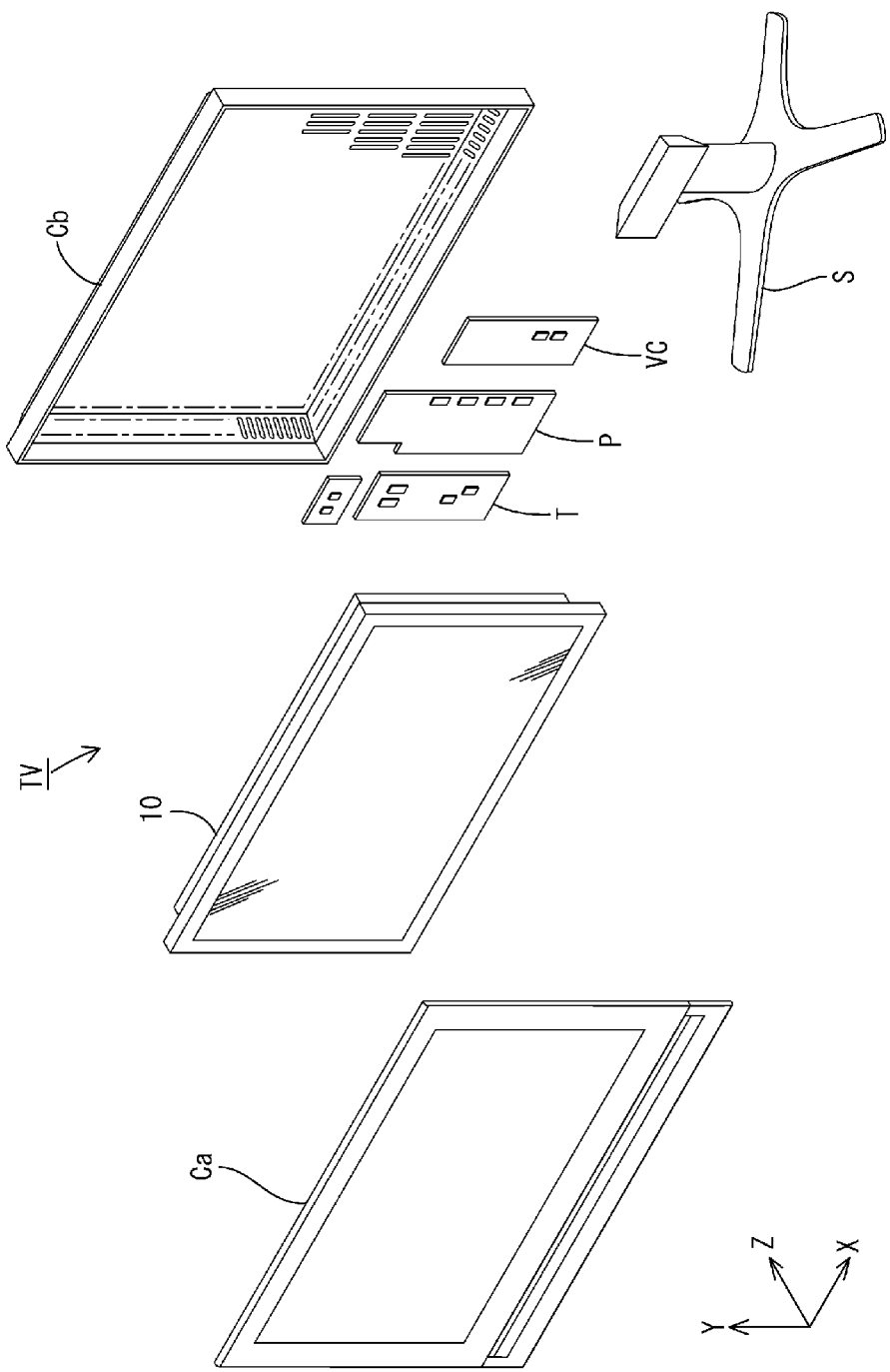
FIG. 1 is an exploded perspective view of a television receiver TV according to Embodiment 1.

As shown in FIG. 1, a television receiver TV according to the present invention includes a liquid crystal display device 10, which is a display device, front and rear cabinets Ca and Cb that house the liquid crystal display device 10 therebetween, a power source circuit substrate P for supplying power, a tuner (receiver) T that can receive television image signals, an image converter circuit substrate VC that converts the television image signals outputted from the tuner T into image signals for use by the liquid crystal display device 10, and a stand S.

The liquid crystal display device 10 is formed in a horizontally long quadrangular (rectangular) shape as a whole, and is disposed such that the long side direction thereof matches the horizontal direction (X axis direction) and the short side direction thereof matches the vertical direction (Y axis direction), respectively. As shown in FIG. 2, the liquid crystal display device 10 includes a liquid crystal panel 11 that is a display panel, and a backlight device (an example of an illumination device) 12 that is an external light source, and these are held together by a frame-shaped bezel 13 and the like.

(Liquid Crystal Panel)

A configuration of the liquid crystal panel 11 in the liquid crystal display device 10 will be explained. As shown in FIG. 3, the liquid crystal panel 11 is formed in a horizontally long quadrangular (rectangular) shape as a whole, and has a pair of transparent (having light transmission characteristics) glass substrates 11a and 11b, and a liquid crystal layer 11c present between these two substrates 11a and 11b, liquid crystal being a material that has optical characteristics that are changed by an applied electric field. The two substrates 11a and 11b maintain a gap equal to the thickness of the liquid crystal layer and are bonded together by a sealing agent (not shown). On the respective outer surfaces of the two substrates 11a and 11b, polarizing plates 11d and 11e are bonded. The long side direction of the liquid crystal panel 11 matches the X axis direction, and the short side direction thereof matches the Y axis direction.

Figure 4:
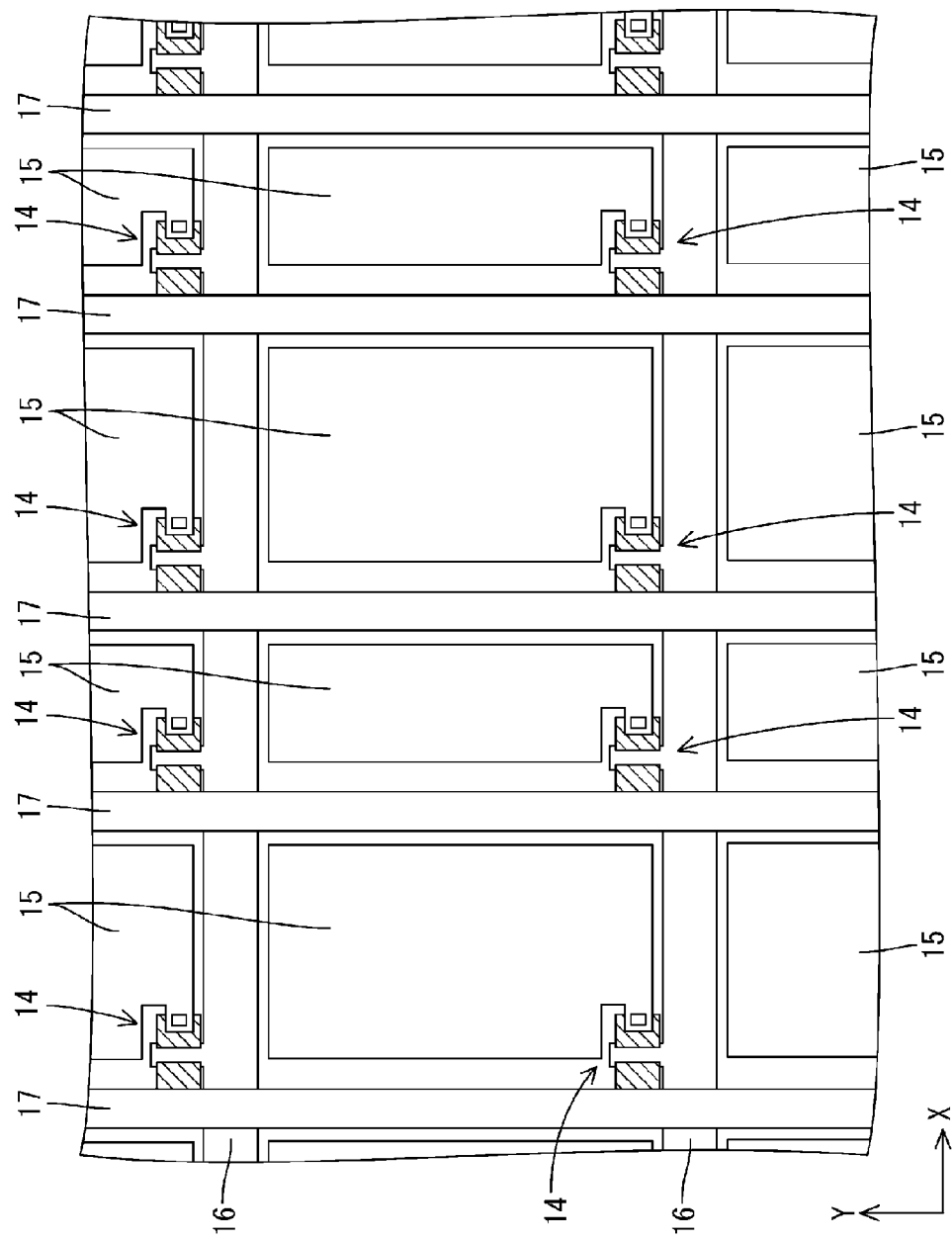
FIG. 4 is an enlarged plan view of an array substrate 11b.

Of the two substrates 11a and 11b, one on the front side (front surface side) is a CF substrate 11a, and the other on the rear side (rear surface side) is an array substrate 11b. As shown in FIG. 4, the inner surface of the array substrate 11b, or in other words, the surface on the liquid crystal layer 11c side (the side facing the CF substrate 11a) has a large number of TFTs (thin-film transistors) 14, which are switching elements, and pixel electrodes 15 formed in a matrix (in rows and columns) thereon. Gate wiring lines 16 and source wiring lines 17 are arranging surrounding these TFTs 14 and pixel electrode 15 in a grid shape. Each pixel electrode 15 has a vertically long quadrangular (rectangular) shape with the long side direction matching the Y axis direction and the short side direction matching the X axis direction, and is made of a transparent electrode such as ITO (indium tin oxide) or ZnO (Zinc Oxide). The gate wiring lines 16 and the source wiring lines 17 are connected to the respective gate electrodes and the source electrodes of the TFTs 14, and the pixel electrodes 15 are connected to the drain electrodes of the TFTs 14. Terminal parts of the gate wiring lines 16 and source wiring lines 17 are formed on an end of the array substrate 11b, and a driver unit for driving the liquid crystal (not shown) is crimp-connected to these terminal parts through an anisotropic conductive film. This driver unit for driving the liquid crystal is electrically connected to a display control circuit board (not shown) through various types of wiring substrates and the like. This display control circuit substrate is connected to the image converter circuit substrate VC (see FIG. 1) in the television receiver TV and supplies driving signals to the respective wiring lines 16 and 17 through the driver unit on the basis of output signals from the image converter circuit substrate VC.

Figure 5:
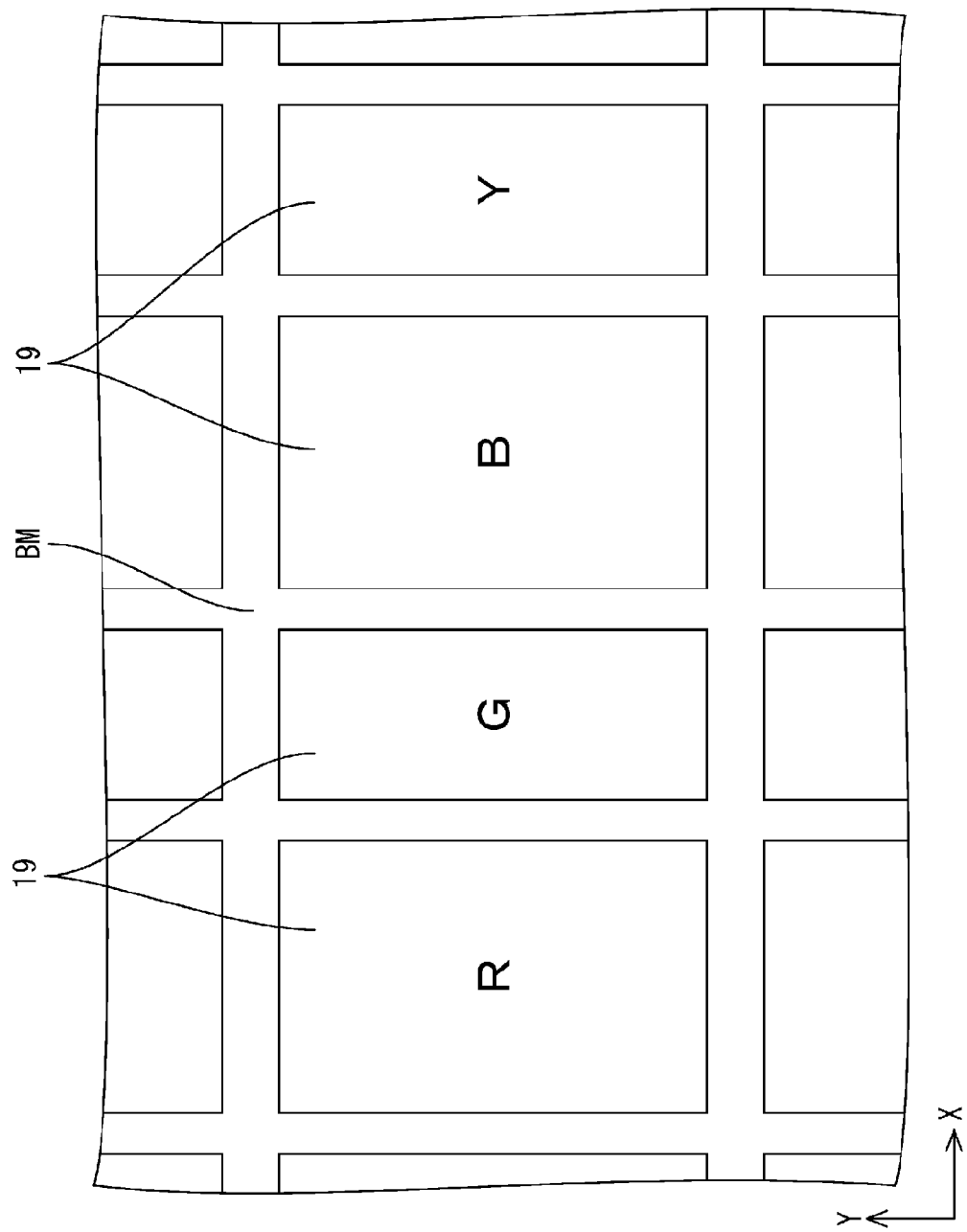

As shown in FIG. 5, the inner surface of the CF substrate 11a, or in other words the surface on the liquid crystal layer 11c side (the side facing the array substrate 11b), has a color filter 19 including a large number of colored portions R, G, B, and Y arrayed in a matrix (rows and columns) and corresponding to respective pixels on the array substrate 11b. The color filters 19 of the present embodiment include a yellow colored portion Y in addition to colored portions of the three primary colors of light, which are a red colored portion R, a green colored portion G, and a blue colored portion B. These colored portions R, G, B, and Y selectively allow light of the corresponding color (the corresponding wavelength) to pass through. Each of the colored portions R, G, B, and Y is formed in a vertically long quadrangular (rectangular) shape with the long side direction matching the Y axis direction and the short side direction matching the X axis direction, respectively, in a manner similar to the pixel electrodes 15. A grid-shaped light-shielding layer (black matrix) BM is disposed between the respective colored portions R, G, B, and Y to prevent the colors from being mixed. As shown in FIG. 3, in the CF substrate 11a, an opposite electrode 20 and an alignment film 21 are formed in this order on the surface of the color filters 19 facing the liquid crystal layer 11c.

The arrangement and size of the respective colored portions R, G, B, and Y constituting the color filters 19 will be explained in detail. As shown in FIG. 5, the colored portions R, G, B, and Y are arranged in rows and columns with the X axis direction as the row direction and the Y axis direction as the column direction. The dimensions of the colored portions R, G, B, and Y in the column direction (the Y axis direction) are all equal, but the dimensions of the row direction (the X axis direction) differ depending on the colored portion R, G, B, or Y. Specifically, the colored portions R, G, B, and Y are arranged along the row direction from the left side shown in FIG. 5 in the order of red colored portion R, green colored portion G, blue colored portion B, and yellow colored portion Y. Of these, the size of the red colored portion R and blue colored portion B in the row direction is larger than the size of the yellow colored portion Y and green colored portion G in the row direction. In other words, the colored portions R and B, which have relatively large row direction dimensions, and the colored portions G and Y, which have relatively small row direction dimensions, are arranged repeatedly in an alternating fashion. Accordingly, the area of the red colored portion R and the blue colored portion B is larger than the area of the green colored portion G and the yellow colored portion Y. The area of the blue colored portion B is equal to the area of the red colored portion R. Similarly, the area of the green colored portion G and the area of the yellow colored portion Y are equal to each other. FIGS. 3 and 5 show a case in which the area of the red colored portions R and the blue colored portions B is approximately 1.6 times larger than the area of the yellow colored portions Y and the green colored portions G.

As a result of the color filters 19 having the above-mentioned configuration, in the array substrate 11b, as shown in FIG. 4, the pixel electrodes 15 in the row direction (X axis direction) differ in size from each other among respective columns. In other words, with respect to the row direction, the size and area of pixel electrodes 15 that face the red colored portion R and the blue colored portion B are larger than the size and area of pixel electrodes 15 that face the yellow colored portion Y and the green colored portion G. The gate wiring lines 16 are all arranged at an equal pitch, while the source wiring lines 17 are arranged at two different pitches corresponding to the sizes of the pixel electrodes 15 in the row direction.

The liquid crystal display device 10 according to the present embodiment as described above uses the liquid crystal panel 11, which has color filters 19 including four colored portions R, G, B, and Y. Therefore, as shown in FIG. 1, the specialized image converter circuit substrate VC is provided in the television receiver TV. In other words, this image converter circuit substrate VC can convert the television image signals outputted from the tuner T into image signals of respective colors of blue, green, red, and yellow, and can output the generated image signals of the respective colors to the display control circuit substrate. The display control circuit substrate drives TFTs 14 provided for pixels of the respective colors in the liquid crystal panel 11 through the respective wiring lines 16 and 17 on the basis on these image signals, thereby appropriately controlling the transmission of light that passes through the respective colored portions R, G, B, and Y of the respective colors.

(Backlight Device)

Next, a configuration of the backlight device 12 of the liquid crystal display device 10 will be explained. As shown in FIG. 2, the backlight device 12 has a substantially box-shaped chassis 22, the front side (the liquid crystal panel 11 side) of which is the light-emitting side, an optical member 23 arranged so as to cover the front side of the chassis 22, and a frame 26 that is arranged along the outer edges of the chassis 22 and that holds the outer ends of the optical member 23 between the frame 26 and the chassis 22. The chassis 22 includes LEDs 24 disposed directly below the optical member 23 (liquid crystal panel 11) so as to face the optical member 23, LED substrates 25 on which the LEDs 24 are mounted, and diffusion lenses 27 attached to the LED substrates 25 in positions where the LEDs 24 are disposed. Accordingly, the backlight device 12 of the present embodiment is a so-called direct-lit type. Inside the chassis 22 there is a reflective sheet 29 that reflects light inside the chassis 22 towards the optical member 23, holding members 28 that can hold the reflective sheet 29 to the LED substrates 25, and first securing pins 51 and second securing pins 52 (see FIG. 8) that can secure the LED substrates 25 to the chassis 22. Next, each component of the backlight device 12 will be described in detail below.

(Chassis)

Figure 6:
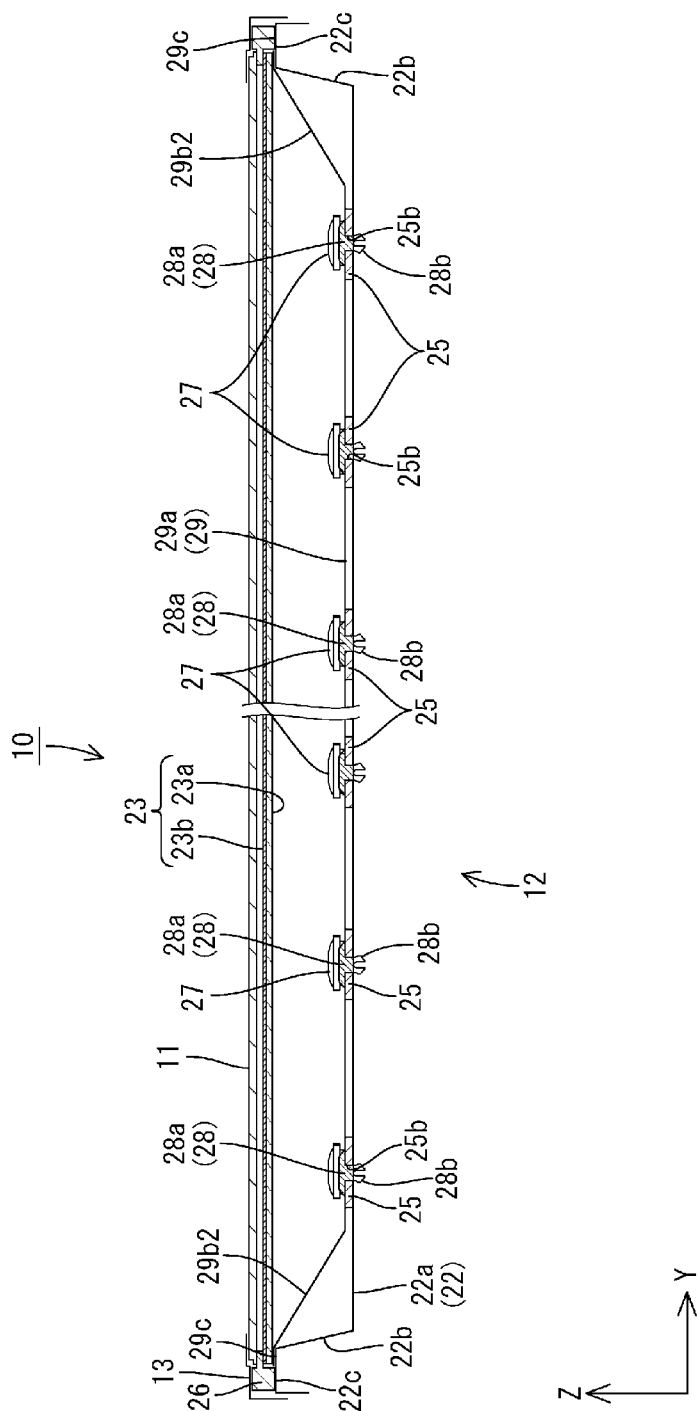
FIG. 6 is a cross-sectional view of the liquid crystal display device 10 along the short side direction.
Figure 7:
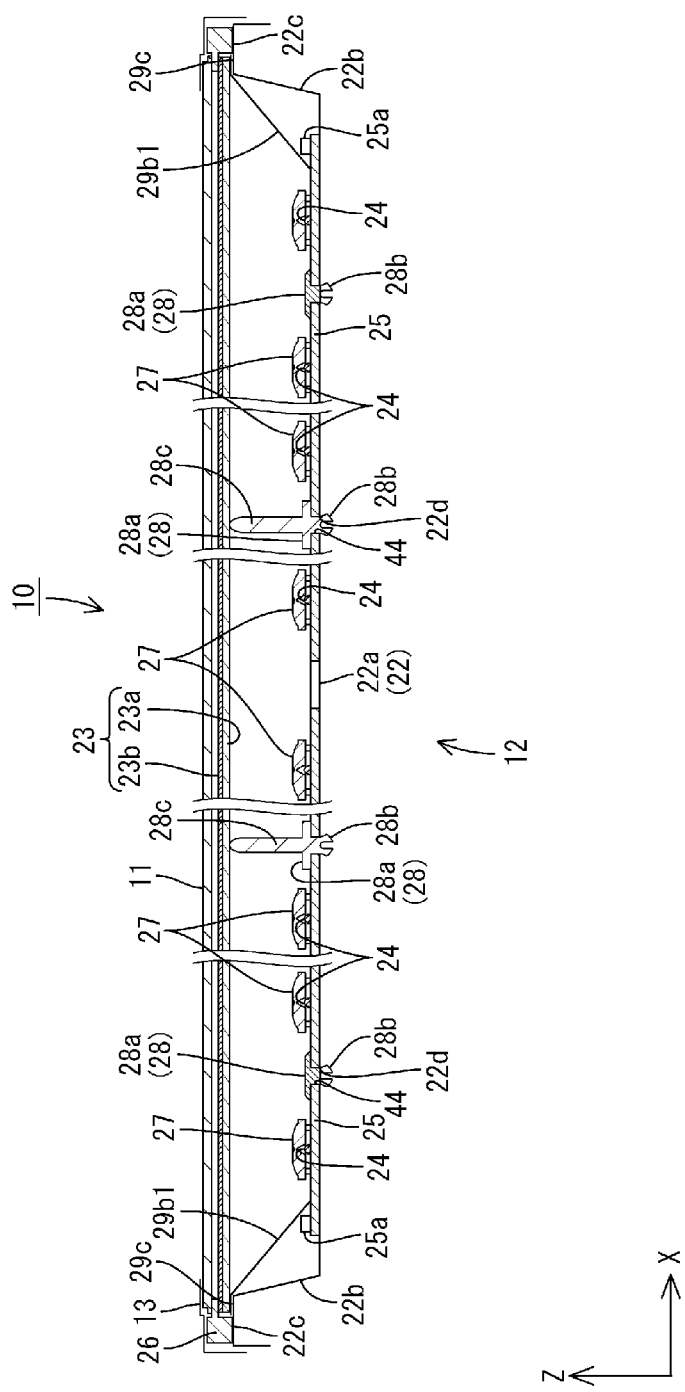
FIG. 7 is a cross-sectional view of the liquid crystal display device 10 along the long side direction.
Figure 8:
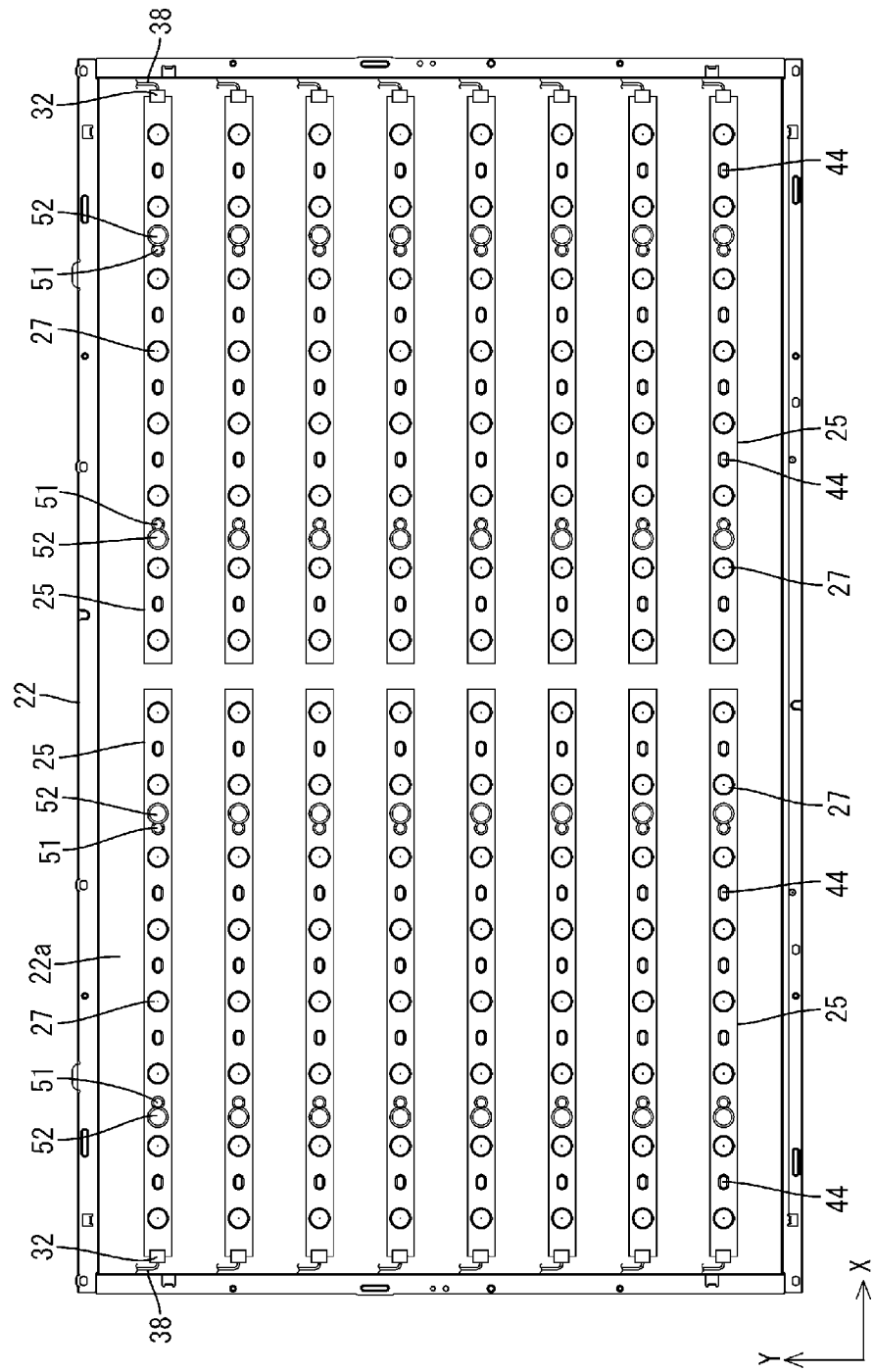
FIG. 8 is a front side plan view of a chassis 22 provided with LED substrates 25.

The chassis 22 is made of metal, and as shown in FIGS. 6 to 8, is constituted of a bottom plate (an example of a plate-shaped portion) 22a that has a horizontally elongated rectangular shape (rectangular) similar to the liquid crystal panel 11, and side walls 22b that rise from the respective end sides (the pair of long sides and the pair of short sides) of the bottom plate 22a towards the front side (the light-exiting side). The chassis 22 has a substantially shallow box shape as a whole and is open on the front side. In the chassis 22, the long side direction thereof matches the X axis direction (horizontal direction), and the short side direction thereof matches the Y axis direction (vertical direction). The frame 26 and the optical member 23, which will be described below, can be placed, from the front side, on respective supporting plates 22c of the chassis 22. The frame 26 is attached to the respective supporting plates 22c with screws. The bottom plate 22a of the chassis 22 has formed therein openings that are attachment holes 22d for attaching the holding members 28. A plurality of the attachment holes 22d are dispersed throughout the bottom plate 22a in positions where the holding members 28 are to be attached.

(Optical Member)

As shown in FIG. 2, the optical member 23 is in a horizontally long rectangular shape in a plan view, as in the liquid crystal panel 11 and the chassis 22. As shown in FIGS. 6 and 7, the outer edges of the optical member 23 are placed on the supporting plates 22c, thereby covering the front side of the chassis 22 and being interposed between the liquid crystal panel 11 and the LEDs 24 (LED substrates 25). The optical member 23 includes a diffusion plate 23a disposed on the rear side (toward the LEDs 24, opposite to the side toward which light is emitted), and optical sheets 23b disposed on the front side (liquid crystal panel 11 side, the side toward which light is emitted). The diffusion plate 23a has a configuration in which a plurality of diffusion particles are dispersed inside a plate-shaped base material made of an almost completely transparent resin having a prescribed thickness, and has the function of diffusing light that is transmitted through. The optical sheets 23b are thinner than the diffusion plate 23a, and two optical sheets 23b are layered, one on top of the other. Specific types of optical sheets 23b include a diffusion sheet, a lens sheet, a reflective polarizing sheet, and the like, for example, and it is possible to appropriately choose any of these as optical sheets 23b.

(Frame)

As shown in FIG. 2, the frame 26 is formed in a frame shape along the outer edges of the liquid crystal panel 11 and the optical member 23. The outer edges of the optical member 23 are sandwiched between the frame 26 and the respective supporting plates 22c (see FIGS. 7 and 8). The frame 26 receives the outer edges of the liquid crystal panel 11 from the rear side thereof, and sandwiches the outer edges of the liquid crystal panel 11 with the bezel 13 that is disposed on the front side (see FIGS. 7 and 8).

(LEDs)

As shown in FIG. 6, the LEDs 24 are mounted on the LED substrate 25, and are so-called top type LEDs in which light-emitting surfaces are on the side opposite to the mounting surface by which the LEDs 24 are mounted. Each LED 24 includes an LED chip that is a light-emitting source that emits blue light, and a green phosphor and a red phosphor as phosphors that emit light by being excited by the blue light. Specifically, each LED 24 has a configuration in which an LED chip made of an InGaN type material, for example, is sealed by a resin material onto a base plate that is attached to the LED substrate 25. The LED chip mounted on the base plate has a primary luminescence wavelength in a range of 420 nm to 500 nm, i.e., the blue wavelength region, and can emit highly pure blue light (single color blue light). The specific primary luminescence wavelength of the LED chip is preferably 451 nm, for example. On the other hand, the resin material that seals the LED chip has the green phosphor that emits green light by being excited by blue light emitted from the LED chip, and the red phosphor that emits red light by being excited by the blue light emitted from the LED chip, the green phosphor and the red phosphor being dispersed in the resin material at a prescribed ratio. By the blue light (light having a blue component) emitted from the LED chip, the green light (light having a green component) emitted from the green phosphor, and the red light (light having a red component) emitted from the red phosphor, the LED 24 can emit light of a prescribed color as a whole such as white light or white light with a bluish tone, for example. Because yellow light can be obtained by mixing the light from the green phosphor having a green component and the light from the red phosphor having a red component, it can also be the that this LED 24 has both the blue component light from the LED chip and yellow component light. The chromaticity of the LED 24 changes based on the absolute value or the relative value of the quantity of green phosphor and red phosphor included, for example; thus, it is possible to adjust the chromaticity of the LED 24 by appropriately adjusting the amount of green phosphor and red phosphor included. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

Next, the green phosphor and the red phosphor included in the LED 24 will be explained in detail. It is preferable that β-SiAlON, which is a type of SiAlON phosphor, be used as the green phosphor. The SiAlON type phosphor is a substance obtained by replacing some of silicon atoms of silicon nitride with aluminum atoms, and by replacing some of the nitrogen atoms thereof with oxygen atoms; in other words, the SiAlON is a nitride. The SiAlON phosphor that is a nitride has superior light-emitting efficiency and durability to those of other phosphors made of a sulfide or an oxide, for example. Here, "having superior durability" specifically means that the brightness is less likely to deteriorate over time even after being exposed to high-energy exciting light from the LED chip. In the SiAlON phosphor, a rare earth element (such as Tb, Yg, or Ag) is used as an activator. β-SiAlON that is a type of the SiAlON type phosphor is a substance represented by a general formula of Si6-zAlzOz N:Eu Si6-ZAlZOZN:Eu(z represents the solid solubility) or (Si,Al)6(O, N)6:Eu (Si,Al) 6(O,N)6:Eu in which aluminum and oxygen are dissolved in β-type silicon nitride crystal. In the β-SiAlON of the present embodiment, Eu (europium) is used as the activator, for example, and because the use of Eu contributes to high purity in the color green that is fluorescent light, it is very useful to adjust the chromaticity of the LED 24. On the other hand, it is preferable to use CASN that is a type of CASN type phosphor as the red phosphor. The CASN type phosphor is a nitride that includes calcium atoms (Ca), aluminum atoms (Al), silicon atoms (Si), and nitrogen atoms (N), and has superior light-emitting efficiency and durability compared to other phosphors made of sulfide or oxide, for example. In the CASN type phosphor, a rare earth element (such as Tb, Yg, or Ag) is used as an activator. CASN that is a type of the CASN type phosphor includes Eu (europium) as an activator, and is represented by a compositional formula of $CaAlSiN_3$:Eu $CaAlSiN_3$:Eu.

(LED Substrate)

As shown in FIG. 8, the LED substrate 25 has a base member that is in a horizontally long rectangular shape in a plan view, and is housed in the chassis 22 so as to extend along the bottom plate 22a with the long side direction thereof matching the X axis direction and the short side direction thereof matching the Y axis direction. Therefore, when the LEDs 24 generate heat and the LED substrates 25 expand due to this heat, the LED substrates 25 will expand in the long side direction (the X axis direction). Of plate surfaces of the base members of the LED substrates 25, a surface facing the front side (surface facing the optical member 23) has the LEDs 24 mounted thereon. The LEDs 24 are disposed such that the light-emitting surfaces face the optical member 23 (liquid crystal panel 11) and such that the optical axis thereof matches the Z axis direction, or in other words, the direction perpendicular to the display screen of the liquid crystal panel 11. A plurality of the LEDs 24 are arranged in linear columns along the long side direction (X axis direction) of the LED substrates 25, and are connected in series by the wiring patterns formed on the LED substrates 25. The pitch at which the respective LEDs 24 are arranged is substantially constant, which means that the respective LEDs 24 are arranged at substantially even intervals. The first securing pins 51 and second securing pins 52 go through the LED substrates 25, and when not secured to the chassis 22 there are openings on the LED substrates 25 at holding member through holes 44, first through holes 41, and second through holes 42. These through holes will be described in detail later.

As shown in FIG. 8, a plurality of LED substrates 25 having the above-mentioned configuration are disposed along the X axis direction and the Y axis direction, respectively, such that the respective long sides are aligned along the same direction and the respective short sides aligned along the same direction. In other words, the LED substrates 25 and the LEDs 24 mounted thereon are arranged together in rows and columns in the chassis 22 (in a matrix/in a plane) where the X direction (the long side direction of the chassis 22 and LED substrates 25) is the row direction and the Y axis direction (the short side direction of the chassis 22 and LED substrates 25) is the column direction. Specifically, there are 16 LED substrates 25 in total in the chassis 22, with two each in the X axis direction and eight each in the Y axis direction. Thus, one end face 25b on the short side of each LED substrate 25 is arranged so as to face one short side (end) of the bottom plate, and the short side that is on the other end of the LED substrate 25 is arranged so as to face the middle of the chassis 22. Of the two ends in the long side direction of each LED substrate 25, a connector 32 is disposed on the end near the outer edge of the chassis 22. By the connector 32 being electrically connected to a connecting part of an external LED driver circuit through a power supply wiring line 38, power is supplied to each LED 24, and the driving of the LEDs 24 can be controlled. The pitch at which the respective LED substrates 25 are arranged along the Y axis direction is substantially even.

The base material of the LED substrates 25 is a metal that is the same material as the chassis 22, such as aluminum, and the wiring pattern, which is made of a metal film such as copper foil, is formed on the surface of this base material through an insulating layer. On the outermost surface, a reflective layer (not shown) that exhibits a white color with excellent light reflecting characteristics is formed. As a result of the wiring pattern, the respective LEDs 24 arranged in a row on the respective LED substrates 25 are connected to each other in series. It is also possible to use an insulating material such as a ceramic as the base material for the LED substrates 25.

(Diffusion Lens)

The diffusion lenses 27 are made of a synthetic resin material (such as polycarbonate or acryl) that is almost completely transparent (having a high light transmittance) and that has a refractive index higher than the air. As shown in FIGS. 6 and 7, the diffusion lenses 27 have a prescribed thickness and are each formed in a substantially circular shape in a plan view. Each of the diffusion lenses 27 is attached to the LED substrate 25 so as to cover the front side of an LED 24, or in other words, so as to be placed over an LED 24 in a plan view. The diffusion lens 27 diffuses light from the LED 24 that has great directivity as the light passes therethrough. That is, the directivity of the light emitted from the LED 24 is lessened as the light passes through the diffusion lens 27; therefore, even when a gap between adjacent LEDs 24 is made larger, an area therebetween becomes less likely to be recognized as a dark area. This makes it possible to reduce the number of LEDs 24 that need to be provided. The diffusion lenses 27 are positioned such that the respective centers thereof substantially match the centers of the respective LEDs 24 in a plan view.

FIG. 6 shows a cross-sectional configuration of the holding members 28, and therefore, in terms of the diffusion lenses 27, the side faces of the diffusion lenses 27 that are positioned behind the holding members 28 on the page are shown.

(Holding Member)

The holding members 28 will be explained. The holding members 28 are made of a synthetic resin such as polycarbonate, and the surfaces thereof are a highly reflective white. As shown in FIGS. 6 and 7, the holding members 28 each have a main part 28a along the plate surface of the LED substrate 25 and a securing part 28b that protrudes from the main part 28a toward the rear side, or in other words, toward the chassis 22 and that is attached to the chassis 22. The main part 28a is formed in a substantially circular plate shape in a plan view, and can sandwich the reflective sheet 29 and LED substrate 25 with the bottom plate 22a of the chassis 22. The securing part 28b can be locked to the bottom plate 22a of the chassis 22 while going through the respectively formed holding member insertion holes 22d and holding member through holes 44 (described later) in accordance with the installation position of the holding members 28 on the bottom plate 22a of the chassis 22 and the LED substrates 25. As shown in FIG. 6, a plurality of holding members 28 are appropriately dispersed throughout the surface of the LED substrate 25, and are adjacent to the respective diffusion lenses 27 (LEDs 24) with respect to the X axis direction.

As shown in FIGS. 6 and 7, the holding members 28 each hold a bottom section 29a of the reflective sheet 29 between the main part 28a and the LED substrate 25. Included among these holding members 28 are two types: those that have a support part 28c protruding towards the front side from the main part 28a, and those that do not have this support part 28c. This support part 28c can support the optical member 23 (directly supporting the diffusion plate 23a) from the rear side. This can maintain a uniform positional relationship in the Z axis direction between the LEDs 24 and the optical member 23, and can restrict unwanted deformations of the optical member 23.

(Reflective Sheet)

The reflective sheet 29 is made of a synthetic resin, and the surface thereof is a highly reflective white. As shown in FIGS. 6 and 7, the reflective sheet 29 is large enough to be laid over the almost entire inner surface of the chassis 22, and therefore, it is possible to cover all of the LED substrates 25 arranged in rows in the chassis 22 from the front side thereof. With the reflective sheet 29, light inside of the chassis 22 can be efficiently directed towards the optical member 23. The reflective sheet 29 includes: the bottom section 29a, which extends along the bottom plate 22a of the chassis 22 and has a size large enough to cover a large portion of the bottom plate 22a; a first raised part 29b1 that rises from the short side ends of the bottom section 29a and that is at an incline to the bottom section 29a; a second raised part 29b2 that rises from the long side ends of the bottom section 29a and that is at an incline to the bottom section 29a; and an extended parts 29c that extend outward from the outer edges of the respective raised parts 29b1 and 29b2 and that are placed on the supporting plate 22c of the chassis 22. The reflective sheet 29 is disposed such that the bottom section 29a thereof faces the front side surfaces of the respective LED substrates 25, or in other words, the mounting surfaces of the LEDs 24. The bottom section 29a of the reflective sheet 29 has lens insertion holes 29d through which the respective diffusion lenses 27 are inserted in positions corresponding to the respective diffusion lenses 27 (respective LEDs 24) in a plan view (see FIG. 2).

Holding member insertion holes 29e (see FIG. 6) for inserting the securing parts 28b of the holding members 28 at a location overlapping each holding member 28 in a plan view are provided in the bottom section 29a. This allows the reflective sheet 29 covering the chassis 22 surface to be held in advance above the chassis 22 by the holding members 28. The bottom section 29a is secured to the chassis 22 together with the LED substrates 25 by the holding members 28 that are attached after the reflective sheet 29 is placed inside the chassis 22, thereby preventing the reflective sheet 29 from being raised or warped.

(Purposes of Having Four Primary Colors in Liquid Crystal Panel and Differentiating Areas of Respective Colored Portions of Color Filters)

As already described, the color filter 19 of the liquid crystal panel 11 according to the present embodiment, as shown in FIGS. 3 and 5, has a yellow colored portion Y in addition to colored portions R, G, and B of the three primary colors of light; therefore, the color gamut of display images that are displayed by the transmitted light can be expanded to achieve a display with excellent color reproduction characteristics. In addition, because the light that is transmitted through the yellow colored portions Y has a wavelength close to the luminosity peak, it tends to be perceived by human eyes as bright light even with a small amount of energy. As a result, even if the power output of the LEDs 24 in the backlight device 12 is reduced, sufficient brightness can be obtained, thereby achieving effects such as a reduction in power consumption of the LEDs 24 and thus excellent environmental performance.

On the other hand, when using the liquid crystal panel 11 having four primary colors as described above, the display image on the liquid crystal panel 11 tends to have a yellowish tone as a whole. In order to avoid this, in the backlight device 12 of the present embodiment, the chromaticity of the LEDs 24 is adjusted to have a bluish tone, blue being a complementary color of yellow, such that the chromaticity of the display image is corrected. For this reason, the LEDs 24 provided in the backlight device 12 have the primary luminescence wavelength in the blue wavelength region as mentioned above, and emit light in the blue wavelength region at the highest intensity.

The research conducted by the inventor of the present invention shows that, when adjusting the chromaticity of the LEDs 24 as described above, as the chromaticity is made closer to blue than to white, the brightness of the emitted light tends to be lowered. In the present embodiment, the proportion of area taken up by the blue colored portion B included in the color filter 19 is greater than that of the green colored portion G and the yellow colored portion Y. This enables more blue light, which is a complementary color of yellow, to be included in the transmitted light of the color filter 19. This way, when adjusting the chromaticity of the LEDs 24 to correct the chromaticity of the display image, it is not necessary to adjust the chromaticity of the LEDs 24 toward the blue color as much as before, and as a result, it is possible to prevent the brightness of the LEDs 24 from decreasing due to the chromaticity adjustment.

Furthermore, according to the research conducted by the inventor of the present invention, when using the liquid crystal panel 11 having four primary colors, the brightness of the red color in particular is lowered among the light emitted from the liquid crystal panel 11. The possible cause thereof is that, in the liquid crystal panel 11 having four primary colors, the number of subpixels constituting one pixel is increases from three to four, thus reducing the area of each subpixel compared to a liquid crystal panel having three primary colors, and as a result, the brightness of the red color in particular is lowered. In the present embodiment, the proportion of area taken up by the red colored portion R included in the color filter 19 is greater than that of the green colored portion G and the yellow colored portion Y. This enables more red light to be included in the transmitted light of the color filter 19 and can suppress a brightness reduction of red light produced in accordance with the four colors of the color filters 19.

(Descriptions of Configurations of Main Parts of the Present Embodiment)

Figure 9:
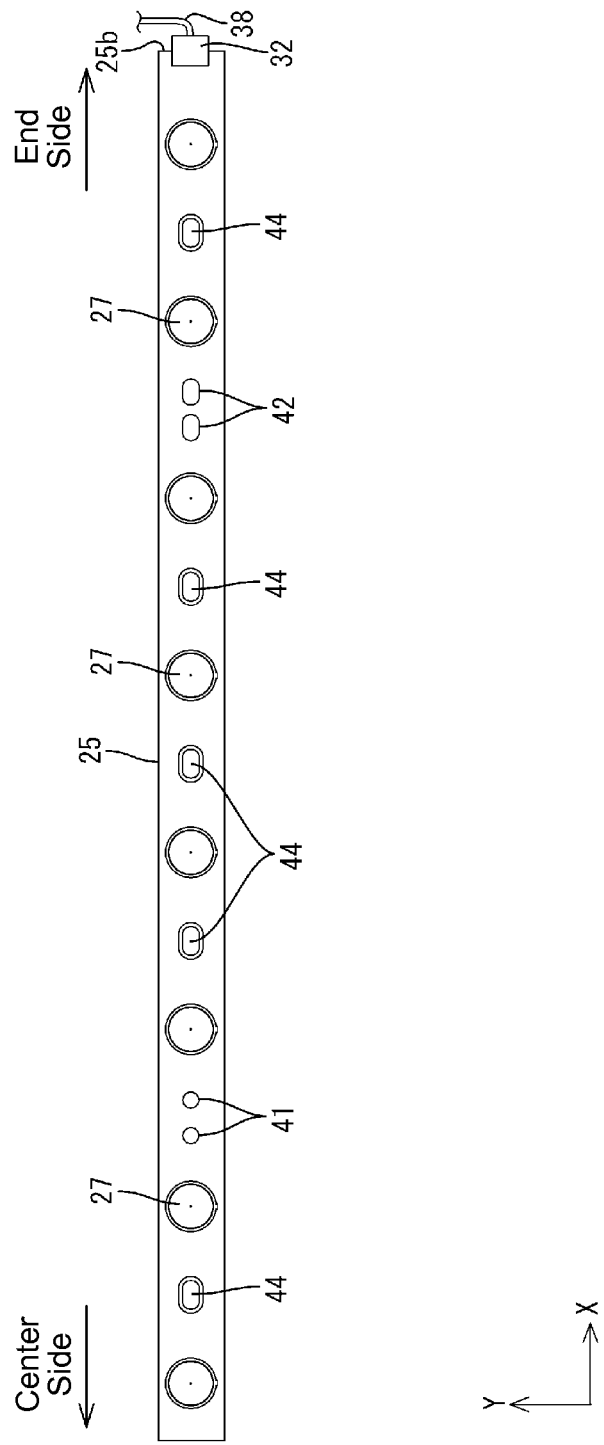
FIG. 9 is an enlarged plan view of the LED substrates 25 before being disposed in the chassis 22.

Next, the holding member through holes 44, first through holes 41, and second through holes 42 formed in the LED substrates 25, which are main parts of the present embodiment, will be explained in detail. As shown in FIG. 9, the holding member through holes 44, first through holes 41, and second through holes 42 are each formed in the LED substrate 25 between the diffusion lenses 27 (LEDs 24) at equal distances to each other. As described above, one end face 25b on the short side of the LED substrate 25 is arranged so as to face one end of the chassis 22, and the end face that is on the other side of the LED substrate 25 is arranged so as to face the middle of the chassis 22.

The holding member through holes 44 are disposed in accordance with the installation position of the holding members 28 as described above and are formed lengthwise along the long side direction of the LED substrates 25. Due to being formed lengthwise as such, the holding member through holes 44 have gaps in the long side direction of the LED substrate 25 when the securing parts 28b of the holding members 28 are inserted. Therefore, when the LED substrate 25 expands due to heat, the LED substrate 25 is free to extend in the long side direction thereof in the vicinity of the holding member through holes 44 without being restricted by the holding members 44.

Figure 10:
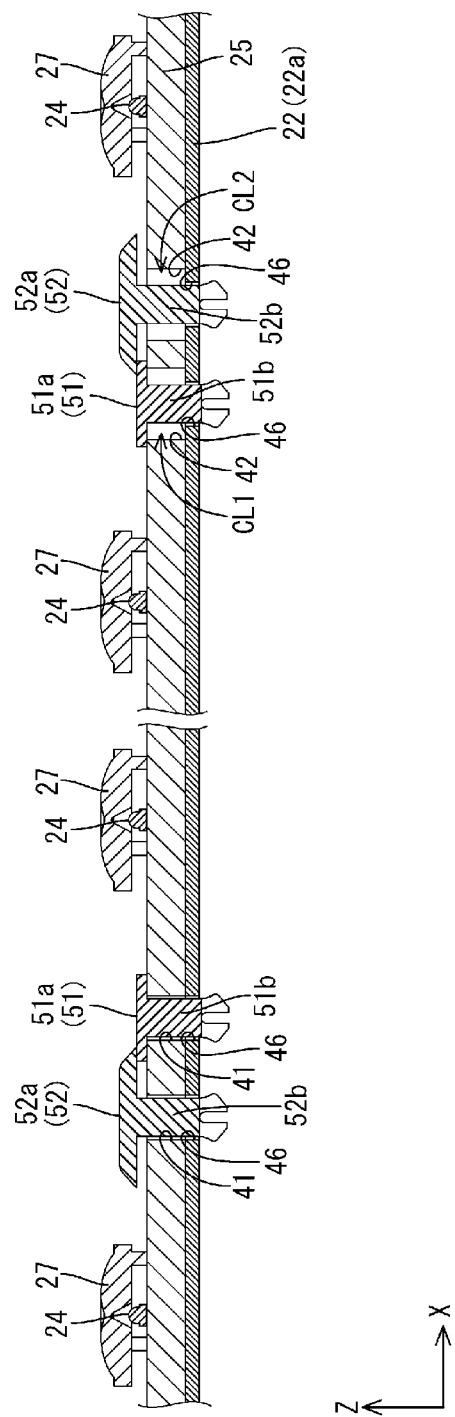
FIG. 10 is an enlarged plan view of the LED substrates 25 after being disposed in the chassis 22.

As shown in FIG. 9, in the LED substrate 25 the first through holes 41 are disposed near the middle of the chassis 22 and the second through holes 42 are disposed near the edge of the chassis 22. The first through holes 41 and second through holes 42 each include two through holes aligned next to each other. Of these two holes, one is a positioning hole that positions the LED substrate 25, and the other is a securing hole that secures the LED substrate 25. As shown in FIG. 10, of these two through holes arranged in parallel, the securing pin 51 goes through the securing hole near the short side of the LED substrate 25 The second securing pin 52 goes through the positioning hole farther from the short side of the LED substrate 25. The first securing pin 51 and second securing pin 52 are constituted of disk-like top parts 51a and 52a exposed above the LED substrate 25 and through hole parts 51b and 52b that go through the through holes. When the first securing pin 51 and second securing pin 52 are fastened, a portion of the top part 52a of the second securing pin 52 overlaps the top part 51a surface of the first securing pin 51. The tips of the through hole parts 51b and 52b are rivet-shaped, and when the first securing pin 51 and second securing pin 52 are fastened these tips are exposed on the rear side of the bottom plate 22a of the chassis 22 and secured to the bottom plate 22a. Bottom plate through holes (an example of a plate-shaped portion through hole) are disposed at locations corresponding to the first through holes 41 and second through holes 42 in the bottom plate 22a of the chassis 22.

In a plan view of the bottom plate 22a of the chassis 22, the two through holes of the first through holes 41 are formed in exact circles, and the two through holes of the second through holes 42 are formed lengthwise along the long side direction of the LED substrate 25. The through hole parts 51b and 52b of the first securing pin 51 and second securing pin 52 are each a circular cylinder shape and have the same size. Specifically, the through hole parts 51b and 52b have a size that allows the LED substrate 25 to be secured in the plate surface direction by the through hole parts being inserted in the first through holes 41 and the bottom plate through holes. These through hole parts also have a size that secures the LED substrate 25 in the short side direction thereof by being inserted in the second through holes 42 and bottom plate through holes while allowing movement in the long side direction of the LED substrate 25.

The first through holes 41 and second through holes are shaped as described above, and the through hole parts 51b and 52b of the first securing pins 51 and second securing pins 52 have a size such as that described above; therefore, in the first through holes 41, the LED substrate 25 is secured in the plate surface direction (the X-Y planar direction) thereof when the through hole parts 51b and 52b of the respective securing pins 51 and 52 are inserted. Spaces CL1 and CL2 are formed in the long side direction of the LED substrate 25 when the respective through hole parts 51b and 52b of the securing pins 51 and 52 are inserted in the second through holes 42. Therefore, when the LED substrate 25 expands due to heat, the LED substrate 25 is restricted from moving in the plate surface direction thereof in the vicinity of the first through holes 41, and restricted from moving in the short side direction of the LED substrate 25 due to the securing pins 51 and 52 in the vicinity of the second through holes 42. The LED substrate 25 is free to extend in the long side direction thereof due to the spaces CL1 and CL2 described above. Accordingly, when the LED substrates 25 generate heat, the section (near the first through holes 41) of each LED substrate 25 near the center of the chassis 22 is restricted from extending, and the section (near the second through holes 42) near the end of the chassis 22 is free to extend. As a result, the sections of each LED substrate 25 that extend due to thermal expansion can be made uniform.

In the backlight device 12 according to the present embodiment as described above, if the LED substrate 25 expands in the long side direction (X axis direction) thereof due to heat generated by the LED substrate 25, the LED substrate will be restricted from expanding in the vicinity of the first through holes 41 and free to expand in the vicinity of the second through holes 42. Accordingly, the LED substrate 25 will expand and extend in the long side direction thereof near one end face 25a of the LED substrate 25, whereas the LED substrate 25 will be restricted from extending near the side opposite to this side face 25a of the LED substrate 25 or a section separated from this side face 25a. This can make the extension amount of each section on the plate surface of each LED substrate 25 substantially uniform, and can make the brightness of the entire display surface of the liquid crystal panel 11 uniform.

In the backlight device 12 of the present embodiment, the bottom plate 22a of the chassis 22 is rectangular, and each of the plurality of LED substrates 25 is arranged such that the long side direction thereof is along the long side direction of the bottom plate 22a. Thus, the brightness of the entire display surface of the liquid crystal panel 11 can be made uniform in the backlight device 12 in which each LED substrate 25 is arranged such that one end face 25a of each LED substrate 25 faces the short side of the bottom plate 22a.

In the backlight device 12 of the present embodiment, the first through holes 41 and second through holes 42 are each constituted of two through holes, one of which is the positioning hole and the other of which is the securing hole. The bottom plate through holes may be two through holes each disposed at a location that respectively overlaps the positioning hole and securing hole. Therefore, in the manufacturing process of the backlight device 12, first the light source substrate is positioned using the positioning hole, and thereafter the light source substrate can be secured in at least one plate surface direction thereof using the securing hole. Thus, the LED substrates 25 can be arranged with precision, and the system for brightness uniformity on the display surface of the liquid crystal panel 11 can be improved.

The backlight device 12 of the present embodiment further includes the diffusion lenses 27 that are respectively disposed on the respective plurality of LED substrates 25 to cover the side to which light is emitted of the LEDs 24 and to diffuse light from the LEDs 24. Thus, as a result of the light from the LEDs 24 passing through the diffusion lenses 27, the light from the LEDs 24 is diffused and the directivity thereof is lessened, and therefore, even when the number of LEDs 24 is reduced, it is possible to maintain a prescribed brightness in the backlight device 12.

In the backlight device 12 of the present embodiment, the holding member through holes 44 are disposed in the LED substrate 25, and the reflective sheet 29 is also provided. The reflective sheet 29 has at least the bottom section 29a arranged on the bottom plate 22a and LED substrate 25, lens insertion holes through which the diffusion lenses 27 are inserted, and holding member insertion holes provided in a location that overlaps the holding member through holes 44. The reflective sheet 29 is held on the bottom plate 22a and the LED substrate 25 by the holding members 28, which are inserted through the holding member insertion holes and thereby locked in the holding member through holes 44. As a result, the usage efficiency of light emitted from the LEDs 24 can be increased.

Embodiment 2

Embodiment 2 will be described with reference to the drawings. The number of through holes in the LED substrates 125 in Embodiment 2 differs from that in Embodiment 1. Other elements are similar to those of Embodiment 1, and therefore, descriptions of the configurations, the operation, and the effect will be omitted. Parts in FIG. 11 that have 100 added to the reference characters of FIG. 9 are the same as these parts described in Embodiment 1.

Figure 11:
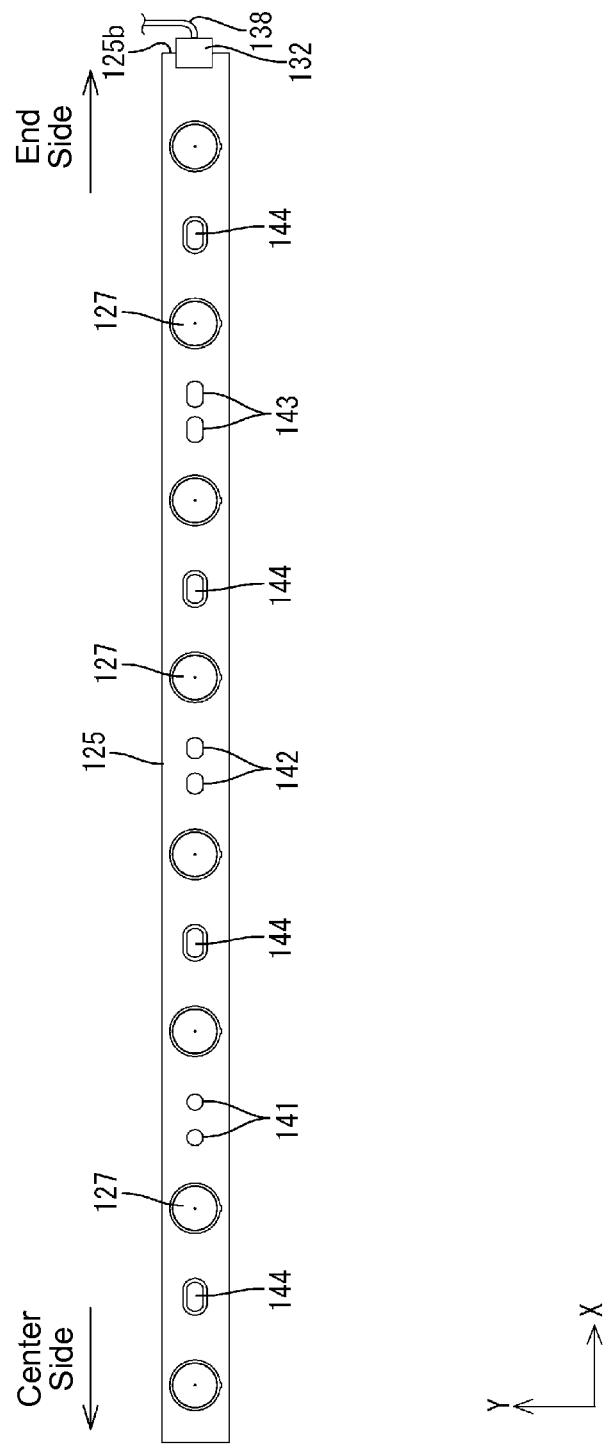
FIG. 11 is an enlarged plan view of LED substrates 125 before being disposed in a chassis 122 in Embodiment 2.

As shown in FIG. 11, in the backlight device according to Embodiment 2, first through holes 141, second through holes 142, and third through holes 143 are disposed in a single LED substrate 125. The through holes are constituted of two through holes each, one being a positioning hole and the other being a securing hole, in a similar manner to Embodiment 1. The first through holes 141 are disposed in the center of a chassis 122, the third through holes 143 are disposed near the end of the chassis 122, and the second through holes 142 are between the first through holes 141 and third through holes 143 and near the center of the LED substrate 125.

The first through holes 141 are formed in exact circles, and the second through holes 142 are formed so as to be more elongated in the lengthwise direction along the long side direction of the LED substrate than the first through holes 141 are. The third through holes 143 are formed so as to be more elongated in the lengthwise direction along the long side direction of the LED substrate than the second through holes 142 are. Therefore, when the LED substrate 125 expands due to heat, the LED substrate 125 is restricted from extending in the plate surface direction thereof in the vicinity of the first through holes 141, and is slightly free to extend in the long side direction of the LED substrate 125 in the vicinity of the second through holes 142 by being slightly restricted by the respective positioning pins. The LED substrate 125 is free to extend in the long side direction thereof in the vicinity of the third through holes 143 without being restricted by the respective positioning pins.

In this way, in the backlight device of Embodiment 2, in a plan view of the bottom plate of the chassis the third through holes 143 are provided that are disposed more towards an end face 125a of the LED substrate 125 than the second through holes 142, that go through the LED substrate 125, and that extend even more in the long side direction of the LED substrate 125 than the second through holes 142. Due to this, in a configuration in which the first through holes 141 to third through holes 143 are disposed in the LED substrate 125, the extension amount of the LED substrate 125 due to heat generated by the LED substrate 125 can be made increasingly larger towards the end face 125a. As such, the brightness on the entire display surface of the liquid crystal panel 11 can be adjusted with precision.

Embodiment 3

Embodiment 3 will be described with reference to the drawings. Embodiment 3 differs from Embodiment 1 in that three types of through holes are formed in a single LED substrate 225. Other elements are similar to those of Embodiment 1, and therefore, descriptions of the configurations, the operation, and the effect will be omitted. Parts in FIG. 12 that have 200 added to the reference characters of FIG. 9 are the same as these parts described in Embodiment 1.

Figure 12:
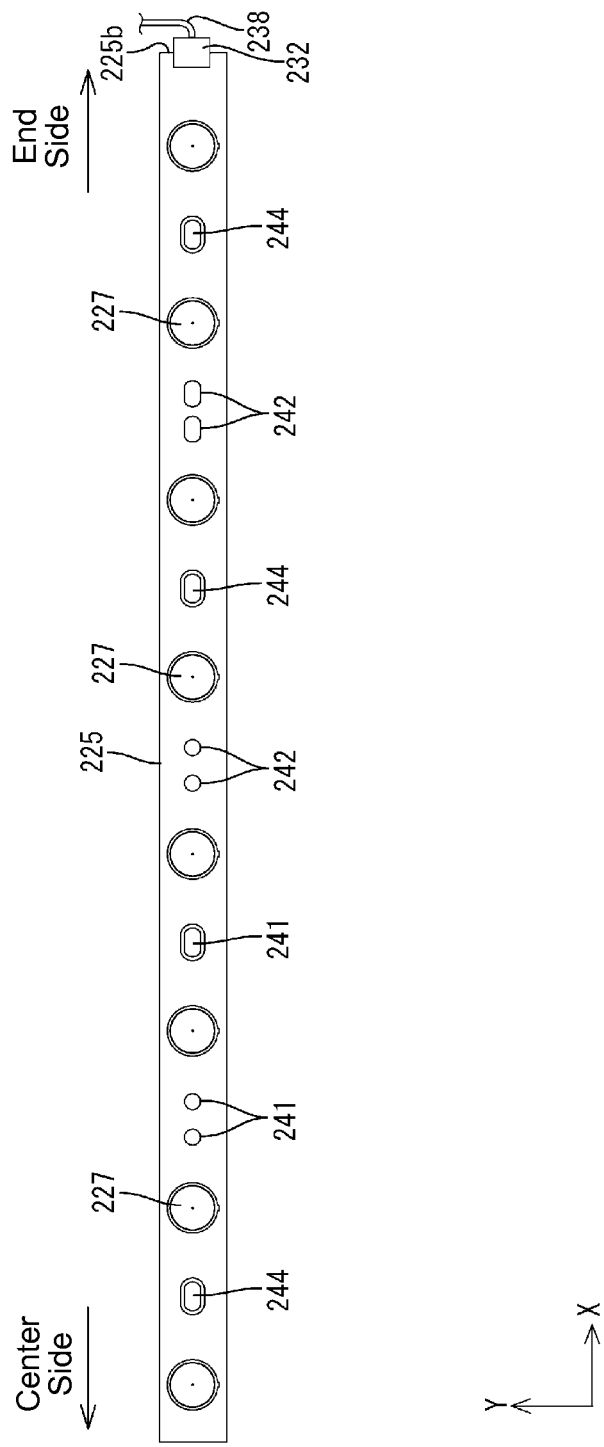
FIG. 12 is an enlarged plan view of LED substrates 225 before being disposed in a chassis 222 in Embodiment 3.

As shown in FIG. 12, in the backlight device of Embodiment 3, there are two first through holes 241 and 241 and one second through holes 242 disposed in a single LED substrate 225. The through holes are constituted of two through holes each, one being a positioning hole and the other being a securing hole, in a similar manner to Embodiment 1. The first through holes 241 are disposed near the center of a chassis 222 and in the vicinity of the center of the LED substrate, and the second through holes 242 are disposed near the end of the chassis 222. With such a configuration, when the LED substrate 255 expands due to heat, the LED substrate 225 is restricted from extending in the plate surface direction thereof near the short side of the LED substrate 225 facing the center of the chassis 225 and in the vicinity of the center of the LED substrate 225. The LED substrate 225 is free to extend in the plate surface direction thereof near the short side of the LED substrate 225 facing an end of the chassis 222.

Embodiment 4

Embodiment 4 will be described with reference to the drawings. Embodiment 4 differs from Embodiment 1 in the number of LED substrates 325 arranged inside a chassis 322. Other elements are similar to those of Embodiment 1, and therefore, descriptions of the configurations, the operation, and the effect will be omitted. Parts in FIG. 13 that have 300 added to the reference characters of FIG. 8 are the same as these parts described in Embodiment 1.

Figure 13:
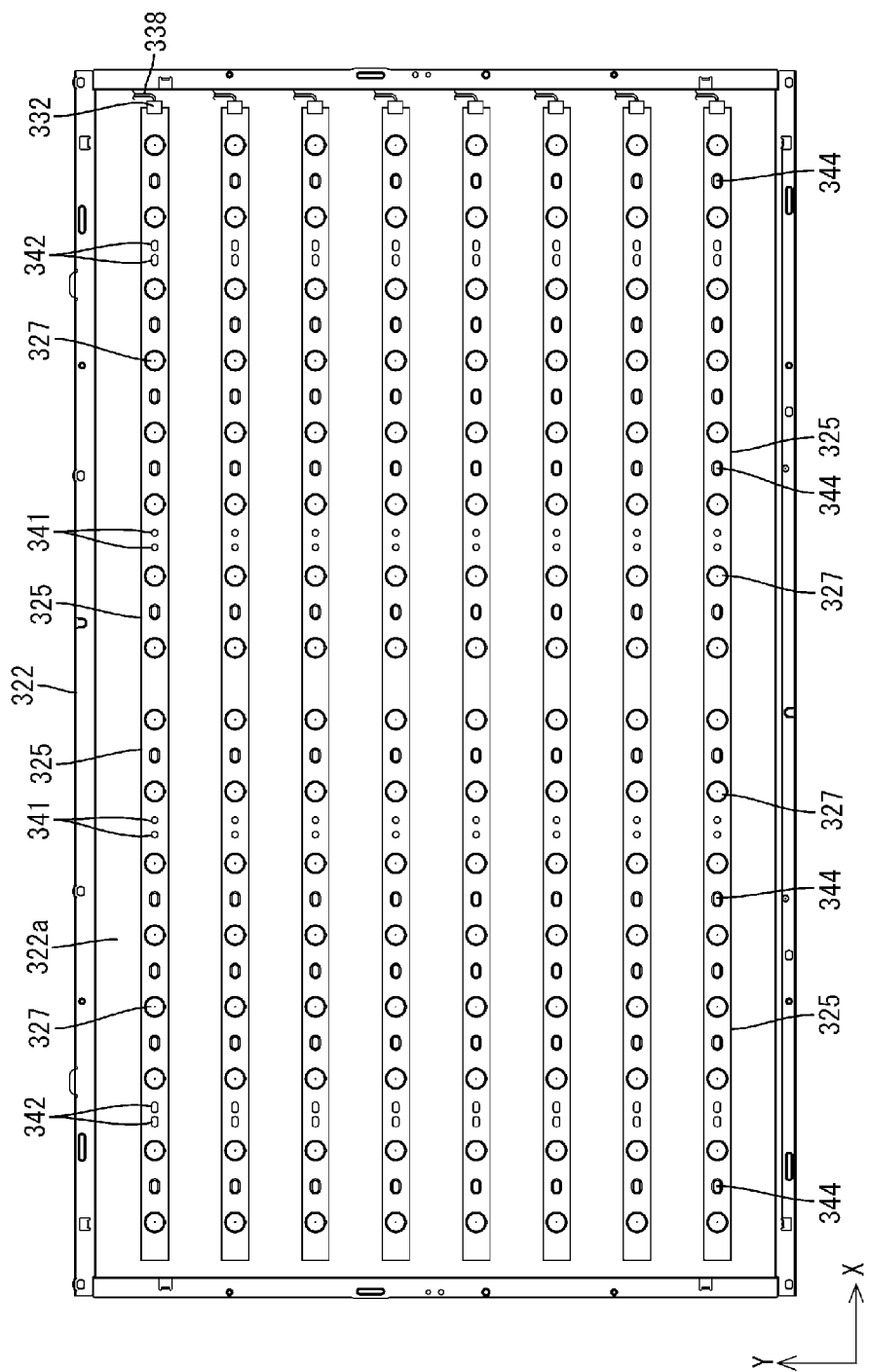
FIG. 13 is a front side plan view of a chassis 322 provided with LED substrates 325 in Embodiment 4.

As shown in FIG. 13, in the backlight device of Embodiment 4, a single LED substrate 325 has a length such that both short sides thereof face both short sides of a bottom plate 322, and a plurality of the LED substrate 325 are arranged along the Y axis direction (the short side direction of the chassis 322 and LED substrate 325). Specifically, in the chassis 322, a total of eight of the LED substrates 325 are disposed in an arrangement with one aligned in the X axis direction and eight aligned in the Y axis direction. With such a configuration, brightness on the entire display surface of the liquid crystal panel can be made uniform in a backlight device that has second through holes 342 disposed in both end sides in the long side direction of the single LED substrate 325 and first through holes 341 disposed near the center in the long side direction.

Embodiment 5

Embodiment 5 will be described with reference to the drawings. Embodiment 5 differs from Embodiment 1 in the number of LED substrates 425 arranged inside a chassis 422. Other elements are similar to those of Embodiment 1, and therefore, descriptions of the configurations, the operation, and the effect will be omitted. Parts in FIG. 14 that have 400 added to the reference characters of FIG. 14 are the same as these parts described in Embodiment 1.

Figure 14:
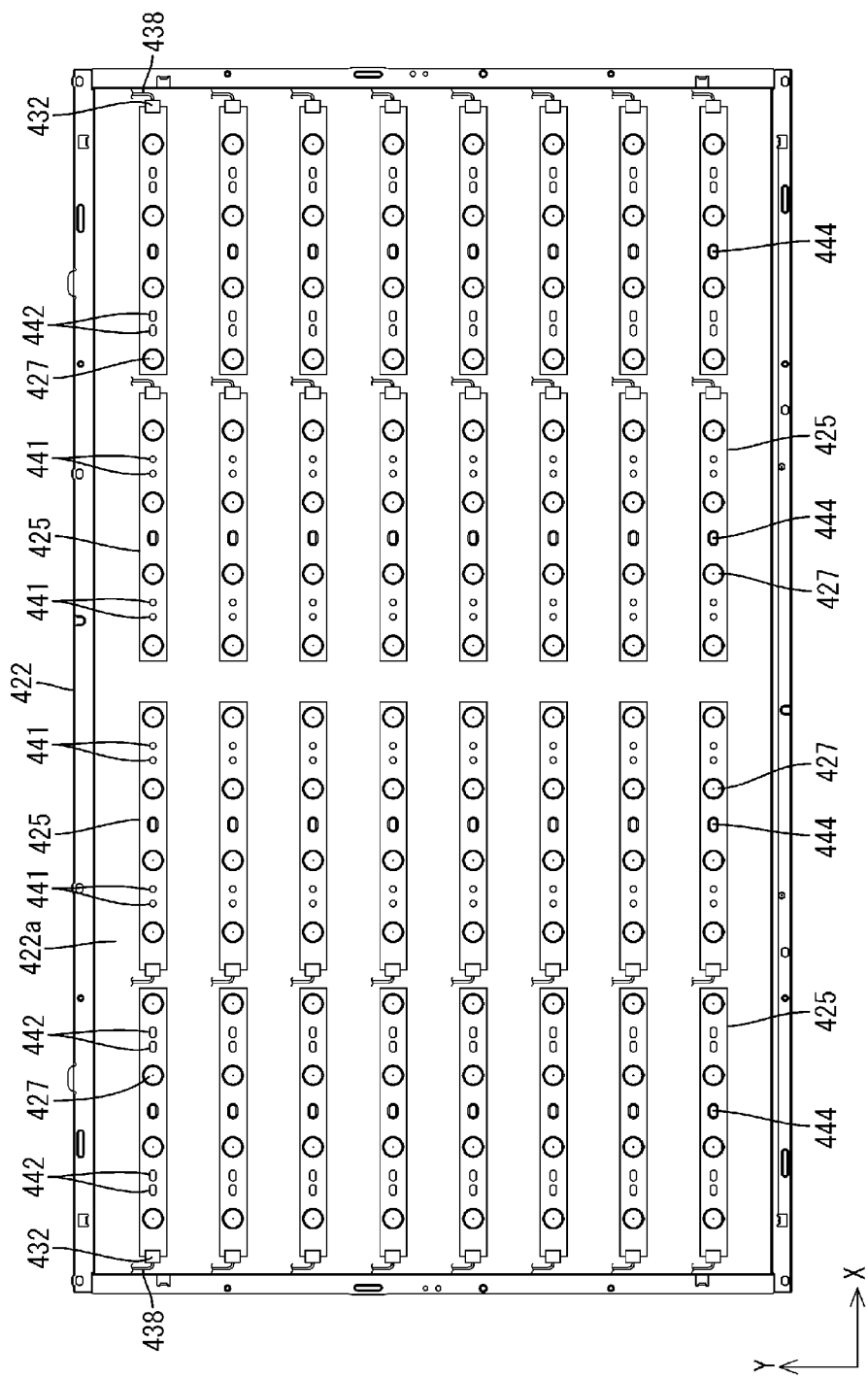
FIG. 14 is a front side plan view of a chassis 422 provided with LED substrates 425 in Embodiment 5.

As shown in FIG. 14, the backlight device of Embodiment 5 has a plurality of the LED substrates 425 arranged along the X axis direction and Y axis direction. Specifically, in the chassis 422, a total of 32 of the LED substrates 425 are disposed in an arrangement with four aligned in the X axis direction and eight aligned in the Y axis direction. Of the 32 LED substrates 425, only first through holes 441 are disposed in two spots on 16 of the LED substrates 425 arranged in two columns near the center of the chassis 422. Meanwhile, only second through holes 442 are disposed in two spots on 16 of the LED substrates 425 arranged near both ends in the vicinity of both short sides of the chassis 422. With such a configuration, when the LED substrates expand due to heat, the 16 LED substrates 425 arranged near the center of the chassis 422 will be restricted from extending in the plate surface direction thereof, and the 16 LED substrates 425 arranged near both ends of the chassis 422 will be free to extend in the plate surface direction thereof. Thus, in the backlight device in which a large number of LED substrates 425 have been arranged, brightness can be made uniform on the entire display surface of the liquid crystal panel.

Modification examples of the respective embodiments above will be described below.

(1) In the respective embodiments above, on the LED substrate the first through holes are disposed near the center of the chassis and the second through holes are disposed near the end of the chassis, but a configuration opposite to this may also be adopted. In other words, the first through holes may be disposed near the end of the chassis and the second through holes may be disposed near the center of the chassis.

(2) In the respective embodiments above, one end face of the LED substrate is arranged so as to face the short side of the bottom plate of the chassis, but the end face of the LED substrate may be arranged so as to face the long side of the bottom plate of the chassis. In this case, the second through holes may be formed in a vertically long direction along the long side direction of the LED substrate.

(3) In the respective embodiments above, the first through holes and second through holes are constituted of two through holes, one being a positioning hole and one being a securing hole, but the number of holes forming each through hole is not limited thereto. The first through holes and second through holes may each be constituted of one through hole, for example.

(4) In the respective embodiments above, the light-emitting side of the LEDs is covered by the diffusion lenses, but a configuration may be adopted in which the diffusion lenses are not provided.

(5) In addition to the respective embodiments above, the arrangement, shape, number, and the like of the first through holes and second through holes can be modified as appropriate.

(6) In addition to the respective embodiments above, the arrangement order of the respective colored portions R, G, B, and Y of the color filters can be modified as appropriate. A transparent part T that does not color transmitted light may be disposed at the installation location of the yellow colored portion. It is also possible to make the area ratio of the colored portions R, G, B, and Y equal. A configuration may also be adopted in which the yellow colored portion is omitted and only the three primary colors of light, red (R), green (G), and blue (B) are used.

(7) In the respective embodiments above, the configuration of the pixels was described with reference to simplified figures (FIGS. 4 and 5), but in addition to the configuration disclosed in these figures, the specific configuration of the pixels can be modified. For example, the present invention can also be applied to the configuration that conducts so-called multi-pixel driving in which each pixel is divided into a plurality of subpixels, and these subpixels are driven such that gradation values thereof are different from each other.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
VC image converter circuit substrate
S stand
10 liquid crystal display device
11 liquid crystal panel
12 backlight device
13 bezel
22, 322, 422 chassis
22a, 322a, 422a bottom plate
24 LED
25, 125, 225, 325, 425 LED substrate
26 frame
27, 127, 227, 327, 427 diffusion lens
41, 141, 241, 341, 441 first through hole
42, 142, 242, 342, 442 second through hole
44, 144, 244, 344, 444 holding member through hole

The invention claimed is:

1. An illumination device, comprising:
a chassis having at least a plate-shaped portion;
a plurality of light source substrates that are rectangular and arranged on a surface of the plate-shaped portion such that at least an end face of a short side of each of the light source substrates faces an edge of the plate-shaped portion;
light sources arranged on the light source substrates, a surface of each of the light sources on the plate-shaped portion side being a light-emitting side;
first through holes penetrating the light source substrates;
second through holes that, in a plan view of the plate-shaped portion, are disposed more in the vicinity of said end face of the respective light source substrates than the first through holes, the second through holes penetrating the light source substrates and being more horizontally elongated than the first through holes along a long side direction of the light source substrates;

through holes in the plate-shaped portion that are disposed in the plate-shaped portion respectively corresponding in position to the first through holes and the second through holes; and securing pins that have a size that allows the light source substrates to be secured in a plate surface direction thereof by the securing pins going through the first through holes and the through holes in the plate-shaped portion, the securing pins securing the light source substrates in the short side direction thereof by going through the second through holes and the through holes in the plate-shaped portion, the securing pins having a size that allows the light source substrates to move in the long side direction thereof, wherein the light sources are white light emitting diodes, and wherein the white light emitting diodes include one of the following combinations: a combination of a first light-emitting chip that emits blue light and a first light-emitting layer that is provided around said first light-emitting chip and that has a light-emitting peak in a yellow region; a combination of a first light-emitting chip that emits blue light and a second light-emitting layer that is provided around said first light-emitting chip and that has respective light-emitting peaks in a green region and a red region; a combination of a first light-emitting chip that emits blue light, a third light-emitting layer that is provided around the first light-emitting chip and that has a light-emitting peak in a green region, and a second light-emitting chip that emits red light; a combination of a first light-emitting chip that emits blue light, a second light-emitting chip that emits red light, and a third light-emitting chip that emits green light; or a combination of a fourth light-emitting chip that emits ultraviolet light and a fourth light-emitting layer that is provided around said fourth light-emitting chip and that has respective light-emitting peaks in a blue region and a red region.

2. The illumination device according to claim 1, wherein the plate-shaped portion is rectangular, and wherein each of the plurality of the light source substrates is arranged such that the long side direction thereof is along a long side direction of the plate-shaped portion.

3. The illumination device according to claim 2, wherein the light source substrates have a length such that both short sides thereof face both short sides of the plate-shaped portion.

4. The illumination device according to claim 1, wherein in the plan view of the plate-shaped portion, third through holes are provided that are disposed closer to the end face of the respective light source substrates than the second through holes and that penetrate the light source substrates, the third through holes being horizontally longer in the long side direction of the light source substrates than the second through holes.

5. The illumination device according to claim 1,
wherein the first through holes and the second through holes each include two through holes, one of said through holes being a positioning hole and one of said through holes being a securing hole, and
wherein the through holes in the plate-shaped portion include two through holes, one of said through holes corresponding in position to the positioning hole and one of said through holes corresponding in position to the securing hole.

6. The illumination device according to claim 1, further comprising diffusion lenses that are arranged on each of the plurality of light source substrates and that cover the light-emitting side of the light sources, the diffusion lenses diffusing light from the light sources.

7. The illumination device according to claim 6,
wherein holding member through holes are disposed on the light source substrates,
wherein a reflective sheet is further provided that has at least a bottom section laid on the plate-shaped portion and light source substrates, lens insertion holes through which the diffusion lenses are inserted, and holding member insertion holes disposed at locations overlapping the holding member through holes, and
wherein the reflective sheet is held on the plate-shaped portion and light source substrates by holding members that are locked in the holding member through holes by being inserted into said holding member though holes.

8. A display device, comprising a display panel that performs display using light from the illumination device according to claim 1.

9. The display device according to claim 8, wherein the display panel is a liquid crystal panel that uses liquid crystal.

10. A television receiver, comprising the display device according to claim 8.

* * * * *